United States Patent
O'Boyle et al.

[19]

[11] Patent Number: 5,810,287
[45] Date of Patent: Sep. 22, 1998

[54] AIRCRAFT SUPPORT PYLON

[75] Inventors: Brian J. O'Boyle, Tacoma; Eric E. Adamson, Newcastle; Michael R. Schramm, Pacific, all of Wash.

[73] Assignee: The Boeing Company, Seattle, Wash.

[21] Appl. No.: 652,965

[22] Filed: May 24, 1996

[51] Int. Cl.⁶ .................................................. B64C 3/32
[52] U.S. Cl. ................... 244/54; 244/118.1; 244/137.4; 60/39.31; 248/554
[58] Field of Search ................. 244/15, 54, 55, 244/137.4, 118.1, 129.1, 131; 60/39.31; 248/554, 555; D12/319, 338, 341, 343

[56] References Cited

U.S. PATENT DOCUMENTS

| | | |
|---|---|---|
| 4,428,189 | 1/1984 | Greenberg et al. . |
| 4,449,680 | 5/1984 | Gratzer et al. ......................... 244/55 X |
| 4,458,863 | 7/1984 | Smith . |
| 4,471,609 | 9/1984 | Porter et al. . |
| 4,506,850 | 3/1985 | McConnell ............................. 244/55 X |
| 4,555,078 | 11/1985 | Grognard . |
| 4,603,821 | 8/1986 | White . |
| 4,616,793 | 10/1986 | Hassler, Jr. ............................. 244/137.4 |
| 4,685,643 | 8/1987 | Henderson et al. .................. 244/55 X |
| 4,828,204 | 5/1989 | Friebel ......................................... 24/15 |
| 5,054,715 | 10/1991 | Hager et al. . |
| 5,102,069 | 4/1992 | Hackett et al. . |
| 5,183,223 | 2/1993 | Cornax . |

*Primary Examiner*—William Grant
*Attorney, Agent, or Firm*—Christensen O'Connor Johnson & Kindness PLLC

[57] ABSTRACT

An improvement of a vertical fin (18) attached to a pylon strut (14) that is cantilevered from a wing rear spar (16) of a supersonic aircraft (9), the improved pylon (10) for mounting heavy assemblies such as an engine (8) to an aircraft wing (12). The fin (18) is a thin, elongate member having a ratio of fin height (36) to fin width (38) of about between 3:1 to 5:1. The ratio of fin length(34) to fin width (38) is preferably equal to or greater than 30:1. The fin at its lower surface (24) is attached to an upper surface (20) of the strut (14). The fin (18) preferably extends forward over a portion of the upper surface (22) of the wing (12) and is additionally attached thereto. One embodiment of a fin construction includes a U-shaped lower channel (40), an inverted U-shaped upper channel (42), a pair of substantially parallel upright sidewalls (32), an arcuate upper closeout member (46), and aerodynamic seals 48 as required. The area defined by the upright sidewalls (32) and the lower and upper channels (40), (42) is filled by a partitioned middle material (44), such as honeycomb core.

23 Claims, 5 Drawing Sheets

AIRCRAFT SUPPORT PYLON

FIELD OF THE INVENTION

The present invention relates to improvements to aircraft under-wing pylons, and more particularly, to improvements to increase stiffness of under-wing engine pylons in order to carry heavier engines, reduce engine deflection, and avoid excessive wing flutter.

BACKGROUND OF THE INVENTION

Heavy under-wing aircraft engines are often mounted near the trailing edge of the wing, in the vicinity of a rear spar. This is done not only to maintain a stable weight balance for the aircraft, but also to ensure that a lesser amount of aerodynamic drag is incurred due to the size and shape of the engine and its installation components. Both aspects are especially important on supersonic aircraft, where design speeds are higher, engines tend to be heavier, and drag is a more critical design concern. A typical arrangement for mounting under-wing engines is to use a support pylon having a rigid strut. The forward end of the strut is cantilevered from the wing rear spar, while the engine is attached to the underside of the opposed strut end. Some mounting designs reduce strut loading by additionally attaching the engine's intake inlet to a forward portion of the wing underside.

A number of disadvantages exist with this cantilevered pylon strut arrangement. A first problem arises when the engine to be installed is especially heavy. The rear spar depth at the outboard engine is usually shallow due to reduced wing thickness in the wing trailing edge and outboard regions. The shallow rear spar depth forces a shallow strut depth. This, in turn, reduces strut stiffness and increases its flexibility. Both of these characteristics undesirably increase engine vertical deflection during static and dynamic loading.

A second disadvantage exists because the stiffness of the outboard strut affects how the outboard engine will influence wing flutter. Wing flutter is a complex aerodynamic phenomenon during which the wing can become violently unstable and break apart. Inadequate strut and wing stiffness tends to make the wing more prone to wing flutter.

A third limitation to the cantilevered strut design is in regard to the attachments used to secure the engine to the wing. Since engine loads are transferred directly from the engine to the wing via the strut and rear spar, any increase in engine size and weight must be reacted by each component and the attachments between adjacent components that exist along the entire engine-to-wing load path. The attachments themselves, however, frequently can not be enlarged, since rear spar depth is often fixed according to aerodynamic wing thickness requirements. The attachments must therefore pass greater loads without the benefit of strengthened components. The attachment loads of larger engine configurations can exceed the wing rear spar's ability to react to these loads in a practical manner, potentially causing failure of the attachment and/or other load path components. Should the loads become unmanageable at any point along the load path, the cantilevered strut concept is then no longer considered viable. The choice of available engines and exhaust nozzles can become severely limited in thin wing supersonic applications.

In response, the traditional method of seeking to avoid excessive engine deflection, excessive wing flutter, and excessive structural loading has been to add structural stiffening in the form of increased structural gages in the strut and wing skins. Another current design solution is to increase component densities. Either of these practices disadvantageously adds weight to the airplane. Some designers have chosen to avoid these excesses by thickening the wing, which can adversely affect the aerodynamic characteristics of the wing. Another solution has been to impose size and weight limits on engines, which is not a solution to the current problems, merely an avoidance of the problems.

Thus, there exists a need for an under-wing aircraft engine support pylon capable of securely carrying the loads of heavier and larger engines while avoiding excessive vertical engine deflection. The support pylon should additionally reduce wing flutter without adding excessive weight or drag penalties, and should be adaptable to both an outboard wing location where the wing is thinner, as well as an inboard location where engines are often placed further aft of the wing rear spar. The ideal support pylon should further react engine loads effectively at all locations along the engine-to-wing load path. The present invention is directed to fulfilling this need.

SUMMARY OF THE INVENTION

In accordance with aspects of the present invention, provided is an improvement to a supersonic aircraft support pylon for mounting heavy assemblies under an outboard aircraft wing. The improvement includes a vertical fin attached to a pylon strut that is cantilevered from a wing rear spar. The improvement fin may be arranged for use at inboard wing locations, for use on subsonic aircraft, and/or for use in mounting assemblies other than engines.

In accordance with further aspects of the invention, the fin includes an upper surface and a lower surface. The fin is attached along its lower surface to an upper surface of the strut. In the preferred embodiment, the fin continues forward a distance over an upper surface of the wing and is additionally attached to the wing thereat.

In accordance with other aspects of the invention, the fin is a thin elongate member having a trapezoidal shape. The fin further includes a forward edge, an aft edge, and substantially parallel and upright side surfaces. The forward edge is preferably formed by a downward taper of the forward-most region of the fin upper edge. The taper is oriented at an angle of about 30 to 50 degrees relative to the general upper wing surface. The aft edge is preferably vertically oriented. In the alternative, the aft edge may be formed by a downward taper of the aft-most region of the fin upper edge at an angle of about 60 degrees or more relative to the general upper wing surface.

In accordance with still further aspects of the invention, the fin length, width, and height will vary according to the amount of pylon stiffening required and the amount of acceptable drag produced from the engine and/or the present invention fin. In a preferred embodiment, the ratio of fin height to fin width is in the range of about 3:1 to 5:1. The ratio of fin length to fin width is preferably more than 30:1. The vertical height of the fin at its forward edge may be different than the vertical height of the fin at its aft edge, with the fin upper surface preferably sloping linearly between the two heights. The amount of slope between heights will vary according to the amount of pylon stiffening required as well as other design considerations.

In accordance with still other aspects of the invention, the attachment of the fin to the strut and/or wing may be accomplished using any one of a number of known attachment methods, e.g., riveting, bolting, screwing, welding, etc. Alternatively, the fin may be made integral to a portion of the wing or may be continuously fastened along the entire length of the adjacent attachment surfaces, such as by gluing.

In accordance with yet further aspects of the invention, one embodiment of the construction of the fin includes a U-shaped lower channel and an inverted U-shaped upper channel. Both channels extend the length of the fin. The fin further includes thin upright sidewalls, an arcuate upper closeout member, and aerodynamic seals as required. The internal fin area defined by the upright sidewalls and the lower and upper channels may include structural stiffeners and/or a partitioned middle material, such as honeycomb core. Potential fin materials include titanium, honeycomb core, aluminum, etc. depending on the design loads and expected temperatures. A preferred range of optimal vertical stiffness capability for the fin is about 20–100 kips per inch of deflection as measured at the aft end of the fin.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The following detailed description is given with reference to its application in mounting an engine 8 to a supersonic aircraft 9 at an outboard wing location. It should be understood that these limitations are provided for illustratively purposes only, since the problems solved by the present invention are most pronounced for engines mounted at outboard locations on supersonic aircraft wings. The present invention under-wing support pylon improvement may be adapted for use on subsonic aircraft. Even though inboard engines are typically attached to a thicker portion of the wing where they do not influence wing flutter significantly, the present invention may also benefit inboard pylon locations for either supersonic or subsonic aircraft. Various under-wing apparatus used for mounting other heavy equipment (such as military weapons, fuel tanks, etc.) may benefit from the present invention as well. In addition, the present invention fin may be used on the underside of an aircraft wing should stiffening be required to support a heavy overwing assembly. In such an instance, the below described configuration is merely transferred to the wing underside.

Figure 1:
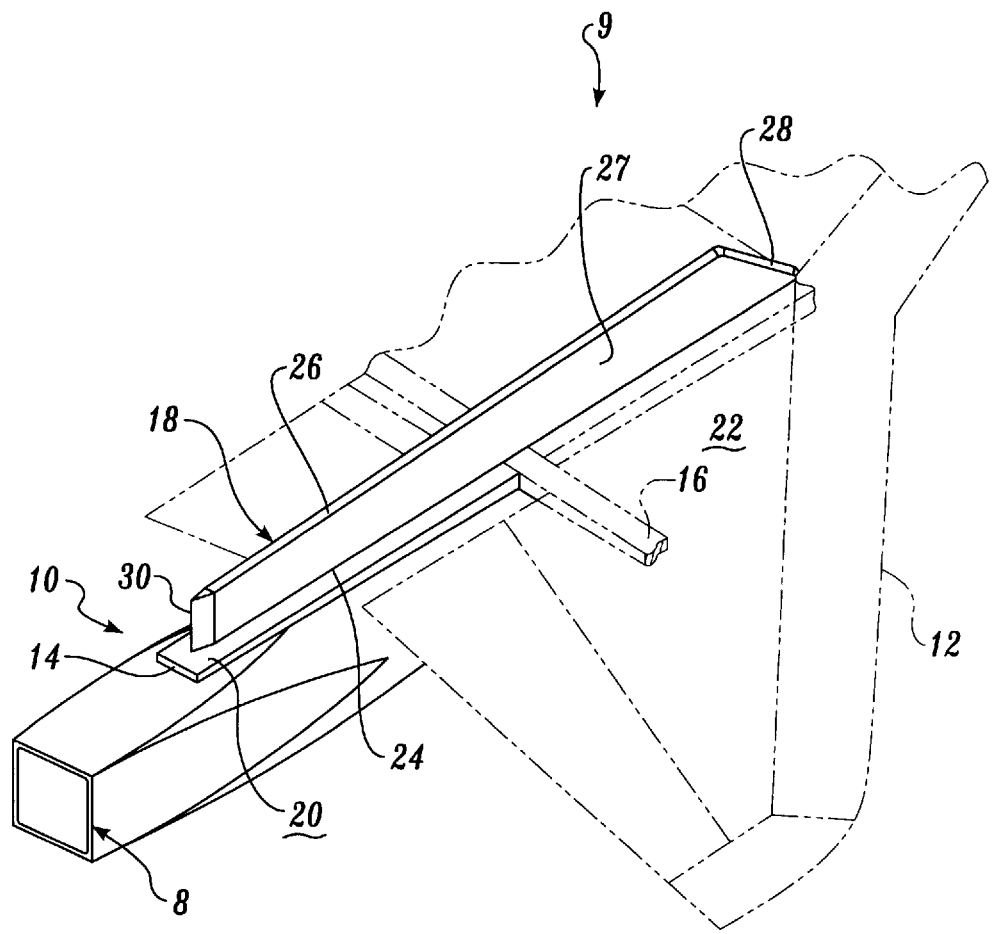
FIG. 1 is an isometric view of a wing pylon improved in accordance with the present invention, a portion of a wing being shown in phantom lines.

In FIG. 1 is an isometric view of a wing pylon 10 improved in accordance with the present invention. A portion of a supersonic wing 12 is shown in phantom lines. A conventional pylon includes a strut 14 that is attached to, and extends from, a wing rear spar 16 such that the strut 14 is cantilevered horizontally aftward. Because various methods are well known for securing the strut 14 to the rear spar 16 (e.g., lug-and-clevis, fixed continuous fasteners, etc.), they are not discussed herein. Likewise, the attachment of the engine 8 to the strut 14 is known and therefore not described herein. For aircraft using mounting arrangements other than a cantilevered strut, the present invention may be adapted accordingly.

Figure 2:
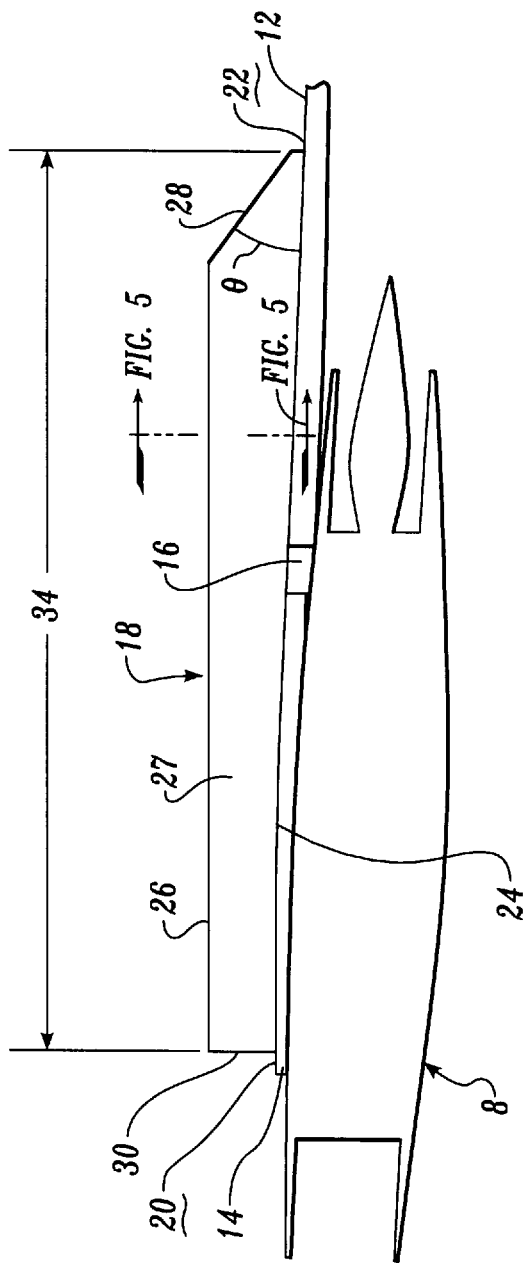
FIG. 2 is a cross-sectional side view of the pylon improvement of FIG. 1.

Still referring to FIG. 1, the improvement of the present invention includes the addition of a fin 18 to an upper surface 20 of the pylon strut 14 and to a portion of the upper surface 22 of the wing 12. The fin 18 is basically an elongate member having a thin, trapezoidal shape. The optimum fin 18 exterior shape and orientation relative to the wing 12 will be driven by a number of aerodynamic and control factors known to those skilled in the art. In general, it is preferable that the fin 18 include a lower surface 24, an upper surface 26, a forward edge 28, an aft edge 30, and substantially parallel upright side surfaces 27. As illustrated in FIG. 2, the forward-most region of the upper surface 26 includes a taper having an angle θ of about 30 degrees relative to the general plane of the wing's upper surface. This angled portion forms the forward edge 28. The preferred angle θ is in the range of about 30 to 50 degrees, but will vary depending on the design requirements of a particular application.

Figure 3:
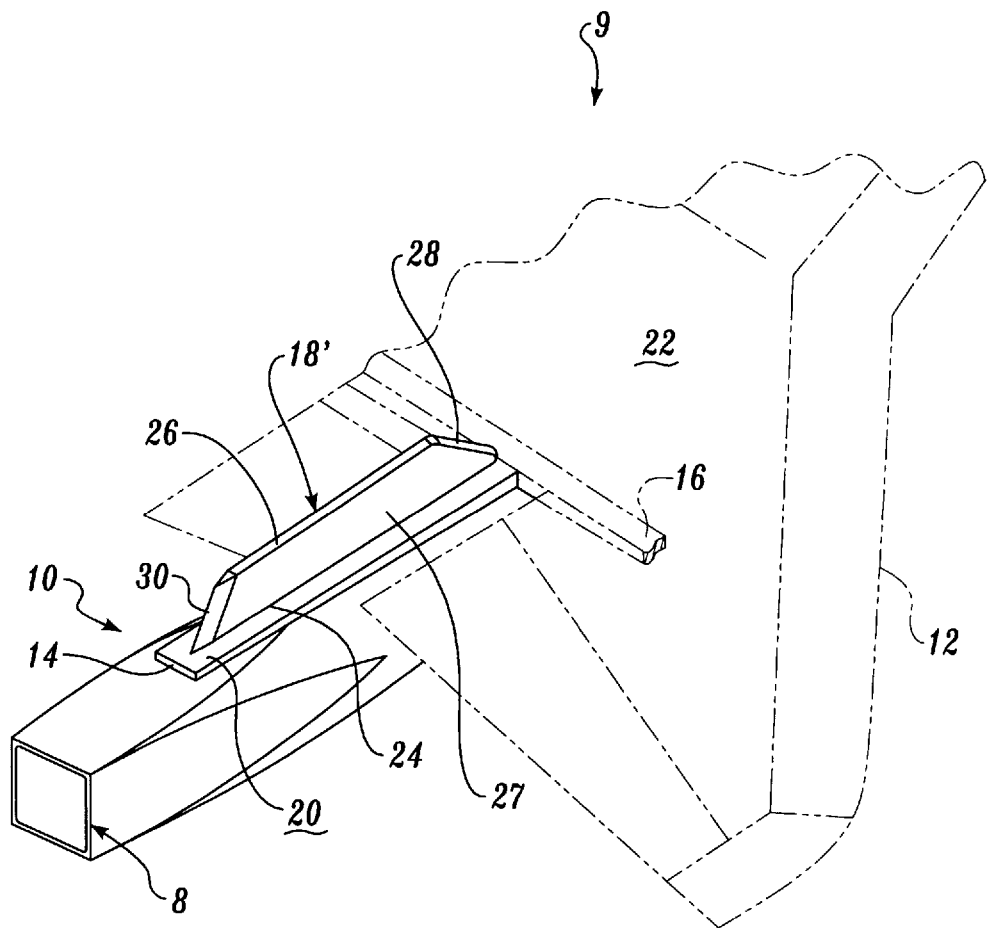
FIG. 3 is an isometric view of an alternative embodiment of a wing pylon improved in accordance with the present invention.
Figure 4:
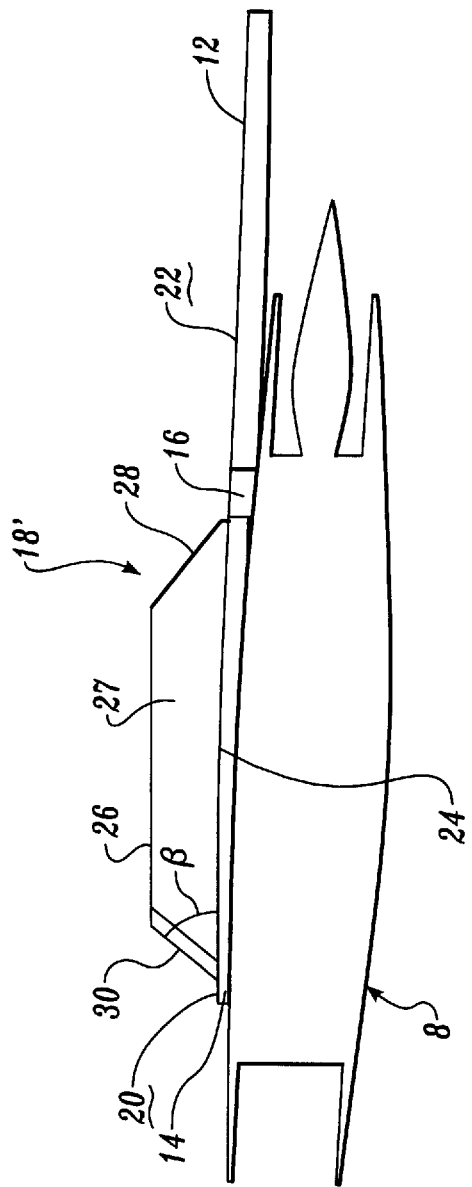
FIG. 4 is a cross-sectional side view of the pylon improvement of FIG. 3.

In the preferred embodiment, the aft-most region of the fin upper surface 26 does not taper, but remains substantially horizontal. Therefore, the aft edge 30 is a blunt vertical edge as shown in FIGS. 1 and 2. In the alternative, some applications may benefit from using an aft edge formed by a downward taper of the aft-most regions of the upper surface at an angle β of approximately 60 degrees or more relative to the general plane of the wing's upper surface. This arrangement is shown in FIGS. 3 and 4. The side surfaces 27 optimally taper together in the rearward direction to meet and form the aft edge 30, thus causing the aft edge to assume a rudder-like appearance. The vertical height of the fin at its forward edge 28 may be made greater or smaller than the vertical height of the fin at its aft edge 30, with the fin upper surface 26 preferably sloping linearly between the two heights. This shape may be optimized for applications in which the aerodynamic performance of the fin is improved when fin forward depth varies relative to fin aft depth.

The overall fin length 34 (shown in FIG. 2), width 38 (shown in FIG. 5), and height 36 will depend upon the size of the engine 8 or other assembly being mounted, the desired pylon stiffness, and the amount of acceptable drag produced from the assembly and/or the present invention fin 18. Since the fin 18 extends into the airflow passing over the wing's upper surface 22, the fin 18 itself is a source of drag. The thin, rectangular shape of the fin 18 shown in FIGS. 1–5 is designed for mounting a heavy engine on a supersonic aircraft 9 at an outboard wing location while maintaining a low level of drag due to the fin 18 and engine installations. For this particular application, a range of ratios that may be used as a guideline for fin height 36 to fin width 38 is between about 3:1 to 5:1. Fin length 34 to fin width 38 is preferably equal to or more than 30:1, although, this value will depend greatly on the drag present in a particular application as well as other aerodynamic considerations.

It has been found that a portion of the associated fin drag can be offset when the installation concept creates a favorable interaction between the fin and the wing's local airflow. This requires that the fin be optimally oriented with respect to the airflow, e.g., using θ up to approximately 60 degrees is ideal for aerodynamic considerations. Regardless of specific sizes, the fin exterior configuration should aid in maintaining smooth flow between the airflows passing above and to either side of the fin 18 during flight. The exterior fin surfaces are therefore smooth and should contain only minor surface interruptions, if any.

FIG. 2 is a cross-sectional side view of the pylon improvement of FIG. 1. The fin lower surface 24 is secured to the upper surfaces of both the strut 14 and the wing 12 using any one of a number of known attachment methods, e.g., riveting, bolting, screwing, welding, etc. Alternatively, the fin 18 could be constructed integral with the wing 12 or strut 14. In either method it is preferable that the joint between the fin 18 and the strut 14 and wing 12 be effectively continuous the entire length of the fin lower surface in order to develop the desired increase in wing and/or pylon stiffness. As shown in FIG. 2, the fin aft edge 30 is generally aligned with the trailing edge of the strut 14. The fin forward edge 28 extends forward of the rear spar 16 and onto the wing upper surface 22 a distance. The greater the distance the fin extends onto the wing, the greater the pylon load carrying capability. A preferred distance is about one quarter to three quarters the wing chord. A preferred method of fin 18 construction is discussed below with reference to FIG. 5.

Referring to FIGS. 3 and 4, an alternative embodiment is provided wherein a shortened fin 18' extends only the length of the strut 14. While this embodiment may be acceptable for some applications, it is not the preferred embodiment. This is because stiffening the strut 14 through the use of a shorter fin 18' reduces strut deflection; but does not reduce attachment loads at the rear spar 16 or stiffen the wing 12 significantly against aerodynamic flutter, which are often problems with larger and heavier engine installations. Using a fin 18 that extends a distance over the wing 12 effectively stiffens the wing 12 against flutter without adding significant weight. The extended fin 18 reduces attachment loads by redirecting loads over a greater portion of the wing 12 as opposed to isolating them just to the rear spar 16. Using such a fin 18 is also more efficient than would be achieved through simply increasing wing skin gages. Skin friction drag will increase as more fin surface area is added to the flow stream, but analysis shows that the weight savings achieved in extending the fin significantly outweighs the drag penalties incurred.

Figure 5:
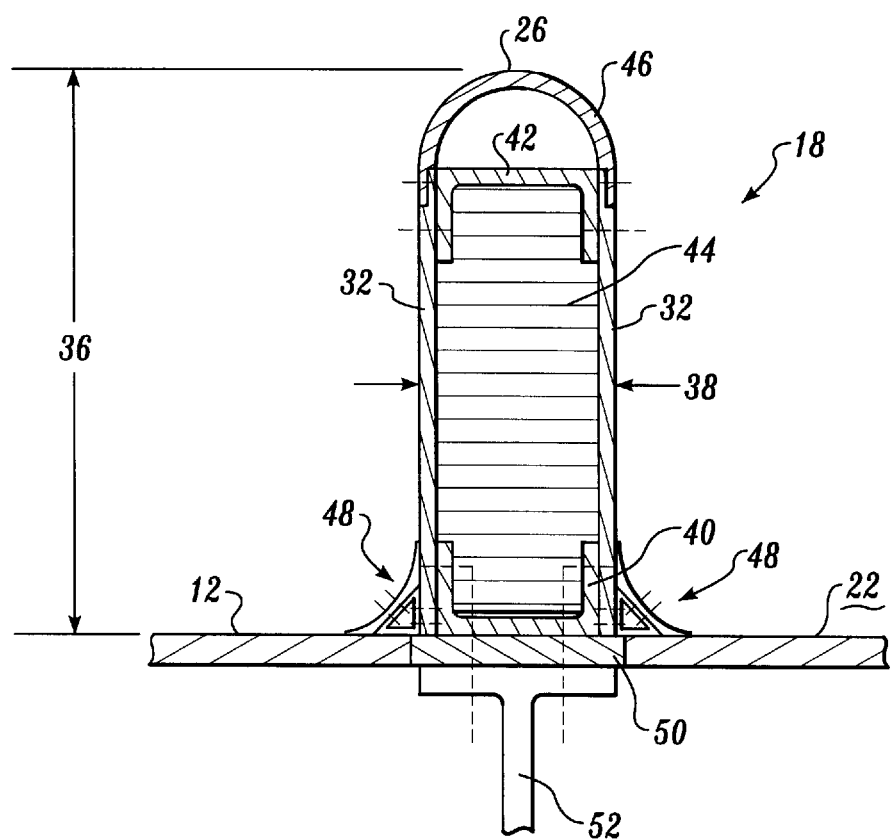
FIG. 5 is a cross-sectional end view of the pylon arrangement of FIG. 2.

One embodiment of an internal construction of the fin 18 is shown in the cross-sectional view of FIG. 5. A U-shaped lower channel 40 extends the length of the fin 18 and is held in opposed relation to an inverted U-shaped upper channel 42 which extends the length of the intended fin upper surface. The bottom surface of the lower channel 40 forms the majority of the fin lower surface 24. The bottom surface of the lower channel 40 is attached to the wing 12 and/or strut 14 and any skin covering the strut or wing. For example, shown in FIG. 5 the lower channel 40 is secured to both a high-density skin 50 and an internal rib 52 of the wing 12.

The area defined by the lower and upper channels 40, 42 is filled by a middle material 44 such as honeycomb core or other light-weight partitioned material. The partitions are oriented substantially horizontally and laterally relative to an airplane frame of reference. Alternatively, the middle material may be omitted, and structural stiffeners (not shown) may be used to interconnect and support the fin subcomponents. The fin side surfaces 27 are defined by thin, upright sidewalls 32 attached to the outer surfaces of the upper and lower channels 40, 42. The sidewalls 32 may be additionally substantially vertical and attached to the middle material 44.

The fin 18 further includes an arcuate closeout 46 attached to the upper channel upper surface. The curved outer surface of the closeout forms the fin upper surface 26. Additionally, it is preferable that the corner formed by each sidewall 32 with the wing 12 and/or strut 14 include an aerodynamic seal 48 attached to both the fin 18 and the adjacent wing/strut structure. These seals smooth the corner and encourage laminar airflow around the fin.

The channels 40, 42 should be formed of a structural material having high stiffness and thermal resistance, e.g., titanium. The upright sidewalls should be formed of a material resistant to shear and buckling, e.g., titanium sheet metal. Sidewall thicknesses of between about 0.20 to 0.30 inches have been found acceptable for some applications. The arcuate closeout is formed of a fairing material that has thermal resistance properties and is compatible with adjacent component materials. A preferred range of vertical fin stiffness is about 20 to 100 kips per inch of deflection as measured at the aft end of the fin.

All fin subcomponent attachments and fin 18 to strut 14, wing 12, or skin attachments are accomplished using known methods considering factors known to those skilled in the art. For example, fastener diameters and spacings will depend largely upon the weight and size of the propulsion assembly and the stiffness desired. It is preferable that the joint between fin 18 and wing 12 and/or strut 14 be continuous the entire length of the fin lower surface. In this regard, the fin 18 could be formed integral with the wing 12 or strut 14 or fastened by welding the fin to the wing/strut along the entire fin length. Near continuous attachment may be simulated by using fasteners every few inches along the length of the fin to wing/strut interface.

As will be appreciated by those skilled in the art upon review of the foregoing, the present invention pylon improvement adds stiffness to the pylon strut 14 without adding a prohibitive amount of weight or drag. This effectively eliminates excessive engine aft nozzle deflection. In the preferred embodiment, the present invention fin 18 may also provide an efficient means to stiffen the wing 12 in order to achieve satisfactory flutter margins without adding significant weight. The extension of the fin 18 over the wing 12 further reduces point loads by distributing the engine loads over a greater portion of the wing. Thus the present invention fin improvement provides a viable mounting system for attaching larger engines and nozzles to outboard wing locations.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. In a wing-mounted pylon for attaching an assembly to an aircraft wing, the pylon including a cantilevered strut having an upper surface, an improvement comprising an upright fin having an tipper surface and a lower surface, the fin at its lower surface being attached to the strut upper surface, the fin for stiffening the strut, wherein the fin extends a forward distance chordwise over the wing about one quarter to three quarters the wing chord.

2. The improvement to a wing-mounted pylon according to claim 1, wherein the attachment of the fin to the strut is coextensive.

3. The improvement to a wing-mounted pylon according to claim 1, wherein the wing includes an upper surface and the fin lower surface is directly attached to the wing upper surface.

4. The improvement to a wing-mounted pylon according to claim 3, wherein the aircraft wing is a supersonic aircraft wing and the assembly is an outboard engine.

5. The improvement to a wing-mounted pylon according to claim 1, wherein the fin is an elongate member having a backwardly-tapered forward edge, an aft edge, and a pair of substantially parallel upright side surfaces.

6. The improvement to a wing-mounted pylon according to claim 1, wherein the fin further includes substantially parallel upright side surfaces wherein the fin height is the average distance between the upper and lower fin surfaces and the fin width is the average distance between the side surfaces, the ratio of fin height to fin width being at least about 3:1.

7. The improvement to a wing-mounted pylon according to claim 1, wherein the fin further includes a pair of substantially parallel upright side surfaces and forward and aft edges, and wherein fin width is the average distance between the upright side surfaces and fin length is the average distance between the fin forward and aft edges, the ratio of fin length to fin width being at least about 30:1.

8. The improvement to a wing-mounted pylon according to claim 1, wherein the fin includes:

(a) U-shaped lower channel, an outer surface of the lower channel forming a substantial portion of the fin lower surface;

(b) an inverted U-shaped upper channel held in spaced relation to the lower channel;

(c) a curved closeout member attached to the upper channel, an outer surface of the closeout member forming the fin upper surface; and (d) a pair of substantially parallel upright sidewalls attached to outer sides of the upper and lower channels.

9. The improvement to a wing-mounted pylon according to claim 8, wherein the fin further includes a middle material disposed in the space defined by the upper and lower channels and the sidewalls, the middle material being honeycomb core having partitions positioned in a lateral orientation relative to the aircraft.

10. The improvement to a wing-mounted pylon according to claim 8, wherein the fin further includes structural stiffeners interconnecting the sidewalls.

11. The improvement to a wing-mounted pylon according to claim 8, wherein the fin further includes at least one aerodynamic seal for smoothing exterior surfaces of the fin and the fin attachments to the strut.

12. The improvement to a wing-mounted pylon according to claim 11, wherein the pair of sidewalls are formed of a partitioned material.

13. The improvement to a wing-mounted pylon according to claim 8, wherein the closeout is formed of a thermally resistant fairing material.

14. A support pylon for attaching a heavy engine to a thin supersonic aircraft wing, the wing having an upper surface over which air flows during flight, the wing having a rear spar, the pylon including:

(a) a strut attached to the wing rear spar in a cantilever fashion, the strut having an upper surface, the heavy engine being attached to and below the strut; and (b) a fin for stiffening the strut, the fin having an upper surface, and a lower surface, and a pair of substantially parallel upright side surfaces, the fin being attached to both a portion of the strut upper surface and a portion of the wing upper surface, the fin extending onto the wing in a substantially chordwise direction, the fin extending into the airflow, wherein fin height is the average distance between the upper and lower surfaces and fin width is the average distance between the upright side surfaces, the ratio of fin height to fin width being at least about 3:1.

15. A support pylon according to claim 14, wherein the fin extends a forward chordwise distance over the wing of between about one quarter to three quarters the wing chord length.

16. A support pylon according to claim 14, wherein the fin is an elongate member having a back-tapered forward edge and a vertical aft edge.

17. The support pylon according to claim 16, wherein fin length is the average distance between the fin forward and aft edges, the ratio of fin length to fin width being at least about 30:1.

18. The support pylon according to claim 14, wherein the fin includes:

(a) U-shaped lower channel, an outer surface of the lower channel forming a substantial portion of the fin lower surface;

(b) an inverted U-shaped upper channel held in spaced relation to the lower channel, the upper and lower channels extending the intended fin length;

(c) a closeout member attached to the upper channel, an outer surface of the closeout member forming the fin upper surface; and (d) said pair of substantially parallel upright side surfaces attached to outer sides of the upper and lower channels.

19. The support pylon according to claim 18, wherein the fin further includes a partitioned middle material disposed in the space defined by the upper and lower channels and the upright side surfaces.

20. In a wing-mounted pylon for attaching a heavy engine to a thin supersonic aircraft wing having a rear spar, the pylon including a strut cantilevered from the rear spar, the strut including an upper surface, an improvement comprising an upright fin having a lower surface, the fin at its lower surface being connected to the strut upper surface, the fin for stiffening the strut, the fin extending a distance over the wing a forward direction to at least the wing rear spar, the fin having structural stiffness in the range of about 20 to 100 kips per inch of vertical deflection as measured at the aft end of the fin.

21. The upright fin according to claim 20, wherein the fin extends a forward chordwise distance over the wing of between about one quarter to three quarters the wing chord length.

22. The upright fin according to claim 20, wherein the fin further includes a pair of substantially parallel upright side surfaces and forward and aft edges, and wherein fin width is the average distance between the upright side surfaces and fin length is the average distance between the fin forward and aft edges, the ratio of length to fin width being at least about 30:1.

23. The upright fin according to claim 20, wherein the fin further includes an upper fin surface and substantially parallel upright side surfaces wherein the fin height is the average distance between the upper and lower fin surfaces and the fin width is the average distance between the side surfaces, the ratio of fin height to fin width being at least about 3:1.

* * * * *

UNITED STATES PATENT AND TRADEMARK OFFICE
CERTIFICATE OF CORRECTION

PATENT NO. : 5,810,287
DATED : September 22, 1998
INVENTOR(S) : B.J. O'Boyle et al.

It is certified that error appears in the above-identified patent and that said Letters Patent is hereby corrected as shown below:

| COLUMN | LINE | ERROR |
|---|---|---|
| [57] Pg. 1, col. 2 | Abstract 7 of text | "length(34)" should read --length (34)-- |
| 6 (Claim 1, line 4) | 49 | "an tipper" should read --an upper-- |
| 7 (Claim 14, line 9) | 55 | after "surface," delete "and" |
| 8 (Claim 22, line 6) | 52 | after "ratio of" insert --fin-- |

Signed and Sealed this

Ninth Day of February, 1999

Attest:

Attesting Officer

Acting Commissioner of Patents and Trademarks